United States Patent Office 3,031,263
Patented Apr. 24, 1962

3,031,263
MANUFACTURE OF METAPHOSPHATES
Verner Blakey Sefton, St. Hilaire Station, Quebec, and Lewis James Sharman, Kingston, Ontario, Canada, assignors to Canadian Industries Limited, Montreal, Quebec, Canada, a corporation of Canada
No Drawing. Filed Sept. 3, 1959, Ser. No. 837,791
Claims priority, application Canada Feb. 18, 1959
6 Claims. (Cl. 23—106)

This invention relates to the manufacture of metaphosphates. More particularly, it relates to the manufacture of calcium metaphosphate from phosphate rock, and to the subsequent concentration of the metaphosphate and its conversion to a water soluble form.

The term "metaphosphate" as used herein is not to be construed to mean individual molecular species, since it is well known in the literature that the structures of these compounds are in doubt. It is not known whether a "metaphosphate" is a monomer or a polymer, and hence by "calcium metaphosphate" is meant a substance the composition of which is such that the ratio of atomic species may be represented approximately by the formula $Ca(PO_3)_2$. Similarly, since metaphosphoric acid may be represented as $HPO_3$, by "metaphosphates" are meant substances which can be represented as salts of this acid.

A known method for manufacturing calcium metaphosphate from phosphate rock comprises the reaction of powdered phosphate rock with phosphorus pentoxide and is suitably conducted by blowing the powdered rock into a furnace where phosphorus is burning. Largely due to the expense of this method, it has not enjoyed widespread success as a method of making agronomically available phosphorus from phosphate rock.

Another method for manufacturing calcium metaphosphate consists of fusing phosphate rock with three times its weight of monammonium orthophosphate, and removing orthophosphatic material from the melt. (See United States Patent No. 2,762,298 issued on September 11, 1956, to M. D. Barnes.) In this method the metaphosphate is subsequently reacted with aqueous ammonium carbonate to give soluble phosphatic materials and calcium carbonate. The latter may be filtered off, and a proportion of the former recirculated to the fusion stage.

It has now surprisingly been discovered that calcium metaphosphate may be produced by the reaction of gaseous sulphur trioxide on phosphate rock or other suitable calcium phosphorus containing materials at temperatures as low as 50° C. Such other materials include calcium orthophosphate and hydroxyapatite. It is desirable that a small amount of moisture be present either in the rock or in the sulphur trioxide stream; with hydroxyapatite sufficient hydroxyl groups are already present, but with phosphate rock the degree of reaction increases rapidly up to 2% water content.

The calcium metaphosphate produced by the above method may be used directly as a fertilizer since the calcium metaphosphate is soluble in neutral ammonium citrate solution (citrate-soluble) and thus agronomically available. Moreover, the product of the reaction of sulphur trioxide and phosphate rock may contain as much as 26% available $P_2O_5$. Alternatively the calcium metaphosphate may be reacted with alkalis or suitable alkali salts to produce alkali metaphosphates. In addition, the proportion of agronomically available phosphorus may be increased and rendered water-soluble by the method of Barnes (loc. cit.), without the disadvantage of recycling a proportion of the product to the calcium metaphosphate production stage.

Thus it is the object of this invention to provide a convenient method for the manufacture of metaphosphates, including both calcium metaphosphate and other metaphosphates derived from it such as the soluble alkali or ammonium metaphosphates.

This object is accomplished by reacting gaseous sulphur trioxide with phosphate rock or other suitable calcium-phosphorus containing material at a temperature lower than 350° C. The reaction is suitably carried out in the presence of a little moisture and the reaction product may be treated to yield other metaphosphates by known methods.

The invention will be more fully illustrated but not limited by the following examples.

EXAMPLE 1

Three types of reactor were used in these experiments, two being horizontal, of 12" length and 1" internal diameter, and the calcium-phosphorus containing material being either laid in a horizontal layer in the tube, or formed into a plug and held by glass wool. The third reactor was vertical, of 1½" diameter, and the material was supported by a fritted glass disc. All three could be heated by electric furnaces.

Sulphur trioxide and water vapour (when required) were passed over or through the material in a stream of nitrogen for a given time, and the product was analysed for sulphate ion content, citrate solubility and water-solubility by standard methods. In some cases excess sulphur trioxide was removed by heating to 350° C. in a stream of nitrogen, and in the remaining cases the excess sulphur trioxide was displaced by nitrogen at the reaction temperature, after the reaction time.

The results are given in Tables I, II and III.

*Table I*
REACTION OF $SO_3$ WITH DRIED PHOSPHATE ROCK

| Sample No. | Temp., °C. | Time, mins. | Initial Moisture in rock, percent | Total $P_2O_5$, percent | Percent Cit. Sol./Total $P_2O_5$ | $SO_3$, percent in prod. | Type of bed |
|---|---|---|---|---|---|---|---|
| 1 | 60 | 8 | .1–.2 | 30.0 | 30.3 | 10.9 | Horizontal layer bed. |
| 2 | 60 | 12 | .1–.2 | 32.0 | 21.2 | 5.0 | Do. |
| 3 | 350 | 16 | .1–.2 | 30.6 | 27.1 | 8.0 | Do. |
| 4 | 60 | 20 | .1–.2 | 28.5 | 48.7 | 17.2 | Do. |
| 5 | 60 | 60 | .1–.2 | 29.6 | 32.4 | 12.2 | Do. |
| 6 | 60 | 70 | .1 | 32.8 | 18.9 | 4.8 | Do. |
| 7 | 60 | 20 | .1 | 30.6 | 31.8 | 11.2 | Do. |
| 8 | 60 | 20 | .1 | 32.8 | 21.4 | 4.6 | Do. |
| 9 | 60 | 30 | .1 | 31.3 | 54.7 | 6.0 | Plug bed. |
| 10 | 300 | 65 | .2 | 31.1 | 19.6 | 6.9 | Vertical reactor. |
| 11 | 300 | 65 | .2 | 31.2 | 26.6 | 6.7 | Do. |

Table II
REACTION OF $SO_3$ WITH MOIST PHOSPHATE ROCK

| Sample No. | Temp., °C. | Time, mins. | Temp. $SO_3$ removal | Moisture content of rock, Percent | Total $P_2O_5$, Percent | Percent Cit. Sol./Total $P_2O_5$ | $SO_3$, Percent in prod. | Water sol. $P_2O_5$, Percent | Type of bed |
|---|---|---|---|---|---|---|---|---|---|
| 12 | 60 | 55 | 250 | 1 | 34.4 | 44.8 | 13.4 | 2.9 | Vertical Reactor. |
| 13 | 60 | 13 | 250 | 1 | 29.0 | 28.6 | 13.4 |  | Do. |
| 14 | 60 | 60 | 60 | 1 | 29.2 | 35.9 | 12.5 |  | Do. |
| 15 | 60 | 50 | 60 | 1 | 27.8 | 50.8 | 17.0 | 9.0 | Do. |
| 16 | 60 | 52 | 60 | 1 | 27.8 | 45.7 | 16.9 |  | Do. |
| 17 | 60 | 10 | 60 | 1 | 29.5 | 35.4 | 11.9 |  | Do. |
| 18 | 60 / 320 | 18 / 27 | 330 | 1 | 26.4 | 52.3 | 23.9 | 2.5 | Do. |
| 19 | 60 / 450 | 14 / 85 | 330 | 1 | 26.1 | 43.0 | 21.4 | .4 | Do. |
| 20 | 60 | 210 | 60 | 1 | 29.2 | 66.2 | 14.2 | 4.9 | Horizontal Plug Bed. |
| 21 | 60 | 60 | 60 | 1 | 28.4 | 43.0 | 15.0 | 7.4 | Do. |
| 22 | 60 / 350 | 37 / 60 | 350 | 1 | 26.3 | 81.8 | 21.0 | 2.7 | Do. |
| 23 | 60 / 350 | 47 / 30 | 350 | 1 | 26.6 | 95.0 | 23.6 | 1.3 | Horizontal Layer Bed. |
| 24 | 60 / 250 | 83 / 27 | 250 | 1 | 25.6 | 97.8 | 24.7 | 2.9 | Do. |
| 25 | 60 / 60 | 103 / 57 | 60 | 2 | 25.7 | 99.0 | 24.5 | 8.3 | Do. |
| 26 | 350 | 67 | 350 | 2 | 26.0 | 96.2 | 23.3 | 1.2 | Do. |

Table III
REACTION OF PHOSPHATE ROCK WITH $SO_3/H_2O$

| Sample No. | Temp., °C. | Time, mins. | Temp., $SO_3$ removal | $SO_3/H_2O$ mole ratio | Total $P_2O_5$ | Cit. sol./ percent Total $P_2O_5$ | $SO_3$, percent in prod. | Type of bed |
|---|---|---|---|---|---|---|---|---|
| 27 | 300 | 65 | 350 | 1.1 | 20.5 | 90.8 | 33.0 | Vertical Reactor. |
| 28 | 300 | 65 | 350 | 1.2 | 22.7 | 67.1 | 27.5 | Do. |
| 29 | 300 | 65 | 350 | 2.2 | 24.2 | 62.9 | 24.1 | Do. |
| 30 | 300 | 65 | 350 | 2.3 | 23.4 |  | 25.8 | Do. |
| 31 | 300 | 65 | 350 | 4.0 | 28.7 | 31.5 | 13.1 | Do. |
| 32 | 300 | 65 | 350 | 4.0 | 29.2 | 25.0 | 11.6 | Do. |
| 33 | 250 | 150 | 250 | 2.0 | 19.8 | 89.5 | 38.7 | Horizontal Layer Bed. |
| 34 | 300 | 130 | 300 | 2.0 | 22.3 | 68.5 | 33.0 | Do. |
| 35 | 350 | 60 | 350 | 2.0 | 29.4 | 81.8 | 12.0 | Do. |
| 36 | 250 | 90 | 350 | 4.0 | 26.7 | 75.0 | 20.2 | Do. |
| 37 | 350 | 100 | 350 | 4.0 | 29.8 | 37.5 | 11.0 | Do. |

Total $P_2O_5$ was calculated from the initial phosphorus concentration in the material and the amount of sulphur trioxide taken up; this calculation was checked by analysis in some cases and found to be correct. The sulphur trioxide in the product was calculated from the amount of sulphate ion found by analysis. The amount of conversion to available phosphorus is shown by the percent cit. sol./total $P_2O_5$ and can be seen to increase generally with the amount of sulphur trioxide taken up. It is important that the amount of both sulphur trioxide taken up and the conversion increase rapidly with moisture content, and in Sample 25, for example, 99% conversion was achieved at 60° C. and 2% moisture in 103 minutes.

In Table III it can be seen that the addition of water vapour in the sulphur trioxide gas stream is less efficient than the use of moist rock. However, such an addition is included within the scope of the invention since approximately 100% conversion is evidently obtained at temperatures around 350° C. in reaction times of about 1 hour.

The reactions in the process of this invention do not resemble those of a common method of rendering the $P_2O_5$ in phosphate rock citrate soluble. This common method for making superphosphate comprises digesting the phosphate rock with sulphuric acid of about 70% strength at temperatures between 120° F. and 250° F. However, in superphosphate, the soluble phosphate is believed to be largely monocalcium phosphate monohydrate $CaH_4(PO_4)_2H_2O$ (water-soluble) and a certain amount of dicalcium phosphate $CaHPO_4$ (citrate-soluble). Neither of these materials is present in significant amounts in the product of the process of this invention as shown by X-ray diffraction. Moreover, the water-solubility of the product of the process of the invention is generally low, showing the absence of monocalcium phosphate monohydrate.

In addition, the product of the process of this invention is superior to ordinary superphosphate in its higher available $P_2O_5$ content, which may be to 26% or higher (Samples 25, 26, 39), where as superphosphate normally contains only 20% available $P_2O_5$.

However, it is known that the phosphates in ordinary single superphosphate, if heated much above 350° C., start to change the water-insoluble phosphates. Thus, at temperatures above this limit, the product of the process of this invention becomes increasingly difficult to distinguish from that obtained by heating single superphosphate. Moreover, it is apparent that as the amount of water in moist rock is increased, it becomes possible for the sulphur trioxide to react with the water, and subsequently to react with the rock in a manner similar to that of the superphosphate reaction. The figures in Table IV clearly show that there is a limit to the amount of water that can be in the rock before the proportion of metaphosphate in the product decreases, and that this limit is about 2%. These results were obtained under conditions less favourable than those of Table II, but it can be seen that the percentage of water soluble $P_2O_5$ rises sharply when more than 2% of water is present, thus indicating the formation of material other than metaphosphate.

Table IV
REACTION OF SO₃ WITH MOIST PHOSPHATE ROCK

| Percent H₂O in rock | Temp. of reaction °C. | Time, mins. | Temp., SO₃ removal, °C. | SO₃, percent | Total P₂O₅, percent | Cit. sol. P₂O₅, percent | Water sol. P₂O₅, percent | Cit. sol. P₂O₅/Total P₂O₅×100 |
|---|---|---|---|---|---|---|---|---|
| 0.9 | 60 / 350 | 90 / 30 | 350 | 24.5 | 25.3 | 11.1 | -------- | 44 |
| 1.0 | 60 | 100 | 260 | 25.5 | 26.2 | 12.2 | 1.4 | 46 |
| 1.0 [1] | 60 | 100 | 260 | 28.0 | 26.1 | 14.9 | 0.4 | 57 |
| 1.1 | 60 / 350 | 90 / 30 | 350 | 27.4 | 25.2 | 14.2 | -------- | 43 |
| 1.1 | 60 | 120 | 60 | 24.5 | 24.7 | 10.6 | -------- | 44 |
| 1.9 | 60 | 100 | 260 | 27.2 | 24.7 | 13.4 | 6.6 | 55 |
| 1.9 | 60 | 100 | 260 | 22.8 | 27.1 | 12.4 | 7.1 | 46 |
| 3.8 | 60 | 110 | 260 | 32.7 | 22.2 | 15.4 | 14.2 | 70 |
| 3.8 | 60 | 110 | 260 | 34.7 | 21.2 | 15.4 | 11.1 | 73 |
| 4.1 | 60 / 350 | 90 / 30 | 350 | 36.9 | 21.0 | 17.0 | -------- | 81 |
| 6.4 | 60 | 110 | 260 | 41.0 | 19.2 | 17.5 | 16.7 | 91 |
| 6.4 | 60 | 110 | 260 | 42.5 | 18.4 | 18.3 | 16.7 | 100 |
| 6.4 | 60 / 250 | 100 / 50 | 260 | 45.0 | 16.6 | 15.8 | 13.7 | 95 |

Reactions carried out in a horizontal reactor with the rock as a layer bed.
[1] Reaction carried out in a vertical reactor.

The product of the process of this invention is suitable for concentration and conversion to water-soluble ammonium metaphosphate by the process of Barnes (loc.cit.). The Barnes' process comprises reacting calcium metaphosphate-containing materials with aqueous ammonium carbonate at substantially room temperature. It may be illustrated by the equations:

$$Ca(PO_3)_2 + (NH_4)_2CO_3 \rightarrow CaCO_3 + 2NH_4PO_3$$

or

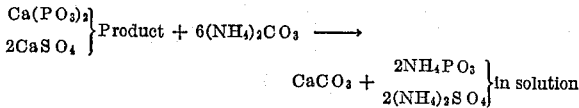

$$\left.\begin{array}{l}Ca(PO_3)_2 \\ 2CaSO_4\end{array}\right\} Product + 6(NH_4)_2CO_3 \longrightarrow CaCO_3 + \left.\begin{array}{l}2NH_4PO_3 \\ 2(NH_4)_2SO_4\end{array}\right\} \text{in solution}$$

The calcium carbonate is precipitated in both cases and may be filtered off.

EXAMPLE 2

In a few experiments, the products of some of the reactions shown in Tables II and III were shaken for four hours with ammonium carbonate solution, filtered, evaporated to dryness and analysed for total P₂O₅. Up to 81% of the citrate-soluble P₂O₅ was converted to the water-soluble ammonium metaphosphate.

What we claim is:

1. A process for manufacturing calcium metaphosphate which comprises, essentially, absorbing gaseous sulphur trioxide in a solid material selected from the group consisting of phosphate rock, hydroxyapatite and tri-calcium orthophosphate in a reaction zone at a temperature between 50° C. and 350° C., terminating said absorption when the solid material has absorbed between 5% and 61% of its weight of sulphur trioxide, and removing from said reaction zone the so-formed calcium metaphosphate-containing material as product.

2. A process as claimed in claim 1 wherein the product material containing calcium metaphosphate is further reacted with aqueous ammonium carbonate, the calcium carbonate formed is filtered off, and a solution of ammonium phosphates separated as product.

3. A process as claimed in claim 1 wherein the material selected from the group consisting of phosphate rock and tri-calcium orthophosphate contains between 0.1% and 2.0% by weight of water.

4. A process as claimed in claim 1 when conducted at a temperature between 50° C. and 100° C.

5. A process as claimed in claim 3 when conducted at a temperature between 50° C. and 100° C.

6. A process as claimed in claim 1 wherein water vapour is added to the sulphur trioxide gas stream.

References Cited in the file of this patent
UNITED STATES PATENTS

| | | |
|---|---|---|
| 1,246,636 | Meyers | Nov. 13, 1917 |
| 2,716,591 | Thompsen | Aug. 30, 1955 |
| 2,899,271 | Miche | Aug. 11, 1959 |